United States Patent
Li et al.

(10) Patent No.: US 11,708,295 B2
(45) Date of Patent: Jul. 25, 2023

(54) COMPOSITION FOR GLASS, GLASS, PREPARATION METHOD AND APPLICATION THEREOF

(71) Applicants: TUNGHSU TECHNOLOGY GROUP CO., LTD., Beijing (CN); TUNGHSU GROUP CO., LTD., Shijiazhuang (CN)

(72) Inventors: Qing Li, Shijiazhuang (CN); Yuguo Shen, Shijiazhuang (CN); Lihong Wang, Shijiazhuang (CN); Quan Zheng, Shijiazhuang (CN); Dongcheng Yan, Shijiazhuang (CN); Junfeng Li, Shijiazhuang (CN); Guangtao Zhang, Shijiazhuang (CN)

(73) Assignees: TUNGHSU TECHNOLOGY GROUP CO., LTD., Beijing (CN); TUNGHSU GROUP CO., LTD., Shijiazhuang (CN)

( * ) Notice: Subject to any disclaimer, the term of this patent is extended or adjusted under 35 U.S.C. 154(b) by 824 days.

(21) Appl. No.: 16/613,653

(22) PCT Filed: May 14, 2018

(86) PCT No.: PCT/CN2018/086752
§ 371 (c)(1),
(2) Date: Nov. 14, 2019

(87) PCT Pub. No.: WO2018/210209
PCT Pub. Date: Nov. 22, 2018

(65) Prior Publication Data
US 2021/0163342 A1    Jun. 3, 2021

(30) Foreign Application Priority Data
May 16, 2017  (CN) .......................... 201710344172.4

(51) Int. Cl.
*C03C 3/097*    (2006.01)
*C03B 19/02*    (2006.01)
*C03B 25/00*    (2006.01)
*C03C 1/02*    (2006.01)
*C03C 4/18*    (2006.01)
*C03C 19/00*    (2006.01)
*C03C 21/00*    (2006.01)
*G06F 3/041*    (2006.01)

(52) U.S. Cl.
CPC .............. *C03C 3/097* (2013.01); *C03B 19/02* (2013.01); *C03B 25/00* (2013.01); *C03C 1/02* (2013.01); *C03C 4/18* (2013.01); *C03C 19/00* (2013.01); *C03C 21/002* (2013.01); *G06F 3/041* (2013.01); *C03C 2204/00* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 9,682,885 | B2 * | 6/2017 | Gross | ......................... C03C 4/02 |
| 9,790,124 | B2 * | 10/2017 | Dejneka | ................. C03C 21/002 |
| 10,550,029 | B2 * | 2/2020 | Gross | .................... C03C 21/002 |
| 2012/0135226 | A1 | 5/2012 | Bookbinder et al. | |
| 2013/0004758 | A1 | 1/2013 | Dejneka et al. | |
| 2013/0295366 | A1 | 11/2013 | Murata et al. | |
| 2014/0087194 | A1 | 3/2014 | Dejneka et al. | |
| 2015/0004390 | A1 | 1/2015 | Kawamoto et al. | |
| 2015/0064473 | A1 | 3/2015 | Dejneka et al. | |
| 2015/0064474 | A1 | 3/2015 | Dejneka et al. | |
| 2015/0119227 | A1 | 4/2015 | Sawai | |
| 2016/0090321 | A1 * | 3/2016 | Bookbinder | ............ C03C 3/097 |
| | | | | 428/220 |
| 2017/0022093 | A1 | 1/2017 | DeMartino et al. | |
| 2017/0283304 | A1 | 10/2017 | Yamazaki et al. | |
| 2017/0295657 | A1 * | 10/2017 | Gross | ..................... C03C 3/093 |

FOREIGN PATENT DOCUMENTS

| | | |
|---|---|---|
| CN | 103228590 A | 7/2013 |
| CN | 103282318 A | 9/2013 |
| CN | 104114503 A | 10/2014 |
| CN | 104125935 A | 10/2014 |
| CN | 104230165 A | 12/2014 |
| EP | 2780291 | 9/2014 |
| JP | 2015500194 A | 1/2015 |
| JP | 2015224155 A | 12/2015 |
| JP | 2016534015 A | 11/2016 |
| TW | 201509848 A | 3/2015 |
| WO | 2013074779 A1 | 5/2013 |
| WO | 2016/094262 A1 | 6/2016 |
| WO | 2016/104454 A1 | 6/2016 |

* cited by examiner

*Primary Examiner* — Kevin M Bernatz
(74) *Attorney, Agent, or Firm* — Volpe Koenig

(57) ABSTRACT

The invention provides a composition for glass, a glass, and a preparation method and application thereof. On an oxide basis, the composition for glass contains 45-64 wt % $SiO_2$, 16-26 wt % $Al_2O_3$, 0.1-2 wt % MgO, 10-17 wt % $Na_2O$, 0.5-15 wt % $P_2O_5$, and optionally 0-2 wt % $TiO_2$. The glass prepared from the composition for glass has a higher chemical resistance, a higher strain point, and a higher compressive stress and depth of compressive stress layer formed on the glass surface, and the glass has a higher Young's modulus.

9 Claims, No Drawings

COMPOSITION FOR GLASS, GLASS, PREPARATION METHOD AND APPLICATION THEREOF

CROSS REFERENCE TO RELATED APPLICATIONS

This application is a 35 USC § 371 national stage of PCT/CN2018/086752, which was filed May 14, 2018, is entitled "COMPOSITION FOR GLASS, GLASS, PREPARATION METHOD AND APPLICATION THEREOF," and claims priority to Chinese Application No. 201710344172.4, filed on May 16, 2017, both of which are incorporated herein by reference as if fully set forth.

FIELD

The present invention relates to the glass field, in particular to a composition for glass, glass, a preparation method and an application thereof.

BACKGROUND

As advanced electronic input devices, touch screens have advantages including simple and convenient use, high response rate, space saving, and easy man-machine communication, etc. Touch screen technology emerged initially in the 1970s, and was generally applied in industrial or commercial devices, such as industrial PCs and POS terminals, etc. in the early stage. In year 2007, Apple Inc. introduced iPhone cell phones into the market, which were a milestone in the development of the touch control industry. Touch screen electronic display devices have slim profile and fashionable appearance, enable the consumers to operate directly and conveniently, improve intimacy of man-machine interaction, are highly favored by the consumers, and start a journey of development of touch screens into main-stream manipulation interfaces.

As touch screen electronic products become popular, people demand that the glass for touch screens not only has high mechanical strength, including high damage resistance and scratch resistance properties, etc., but also has excellent toughness. To meet the demand, the strength of the glass must be improved while the toughness of the glass is improved. However, mechanical properties of glass made from existing compositions for glass can't meet the requirements for production of glass for cover plates satisfactorily yet. Therefore, there is an urgent need for a composition for glass and a preparation method that can remarkably improve the overall mechanical properties of the prepared glass.

SUMMARY

To overcome the above-mentioned drawbacks in the prior art, the present invention provides a composition for glass, glass, a preparation method and an application thereof.

To attain the above object, in a first aspect, the present invention provides a composition for glass, wherein based on the total weight of the composition for glass, on an oxide basis, the composition for glass contains 45-64 wt % $SiO_2$, 16-26 wt % $Al_2O_3$, 0.1-2 wt % MgO, 10-17 wt % $Na_2O$, 0.5-15 wt % $P_2O_5$, and optionally 0-2 wt % $TiO_2$.

Preferably, based on the total weight of the composition for glass, on an oxide basis, the composition for glass contains 45-64 wt % $SiO_2$, 16-25 wt % $Al_2O_3$, 0.1-2 wt % MgO, 10-16 wt % $Na_2O$, 1-15 wt % $P_2O_5$, and optionally 0.01-2 wt % $TiO_2$.

Preferably, based on the total weight of the composition for glass, on an oxide basis, the composition for glass contains 45-64 wt % $SiO_2$, 16-25 wt % $Al_2O_3$, 0.1-2 wt % MgO, 10-16 wt % $Na_2O$, 8-15 wt % $P_2O_5$, and optionally 0.1-1.8 wt % $TiO_2$.

Preferably, the composition for glass does not contain one or more of $K_2O$, $As_2O_3$, $Sb_2O_3$, $SO_3$ and F.

In a second aspect, the present invention further provides a method for preparing glass, which comprises treating the above-mentioned composition for glass by mixing, melting, homogenization, cast molding, and annealing sequentially.

Preferably, the method further comprises: treating the annealed glass by slicing, polishing, and chemical strengthening.

In a third aspect, the present invention further provides glass obtained with the above-mentioned preparation method.

Preferably, the density of the glass is 2.42 $g/cm^3$ or lower, the strain point is 629° C. or higher, the thermal expansion coefficient at 50-350° C. is $94.19 \times 10^{-7}/°$ C. or lower, the Young's modulus is 81.6 GPa or higher, the light transmittance is 90.1% or higher, the compressive stress is 760.5 MPa or higher, the depth of stress layer is 53.1 μm or higher, the fracture toughness is 6.76 $MN/m^{3/2}$ or higher, the erosion rate in 5 wt % hydrochloric acid solution is 0.537 $mg/cm^2$ or lower, the erosion rate in 10 wt % hydrofluoric acid buffer solution is 1.968 $mg/cm^2$ or lower, and the erosion rate in 10 wt % hydrofluoric acid solution is 9.915 $mg/cm^2$ or lower.

Preferably, the density of the glass is 2.389-2.42 $g/cm^3$, the strain point is 629-660° C., the thermal expansion coefficient at 50-350° C. is $84.27-94.19 \times 10^{-7}/°$ C., the Young's modulus is 81.6-83.5 GPa, the light transmittance is 90.1-91.0%, the compressive stress is 760.5-831.5 MPa, the depth of stress layer is 53.1-65.7 μm, the fracture toughness is 6.76-7.23 $MN/m^{3/2}$, the erosion rate in 5 wt % hydrochloric acid solution is 0.503-0.537 $mg/cm^2$, the erosion rate in 10 wt % hydrofluoric acid buffer solution is 1.902-1.968 $mg/cm^2$, and the erosion rate in 10 wt % hydrofluoric acid solution is 9.631-9.915 $mg/cm^2$.

In a fourth aspect, the present invention further provides an application of the above-mentioned composition for glass or the above-mentioned glass in preparation of display devices, preferably application in preparation of touch screen cover plates.

The glass prepared in the present invention has a higher chemical resistance, a higher strain point, a higher compressive stress on glass surface and depth of compressive stress layer in the glass, and higher Young's modulus, and thereby achieves excellent fracture toughness, which is greatly beneficial for decreasing the brittleness of the glass and improving the impact resistance of the glass; in addition, the glass for cover plates is resistant to devitrification and easy to be vitrified, meets the production process requirements, has excellent heat resistance, impact resistance, scratch resistance and abrasion resistance properties, can effectively protect the glass surfaces of display products against damages from impact and scratching, and is suitable for use as glass for cover plates. Moreover, the glass for touch screen cover plates prepared according to the present invention can be widely applied in cell phone, computer, digital and optical lens industries and other fields.

Other features and advantages of the present invention will be further detailed in the embodiments hereunder.

DETAILED DESCRIPTION

Hereunder some embodiments of the present invention will be detailed. It should be understood that the embodiments described here are only provided to describe and explain the present invention rather than constitute any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides a composition for glass, wherein based on the total weight of the composition for glass, on an oxide basis, the composition for glass contains 45-64 wt % $SiO_2$, 16-26 wt % $Al_2O_3$, 0.1-2 wt % MgO, 10-17 wt % $Na_2O$, 0.5-15 wt % $P_2O_5$, and optionally 0-2 wt % $TiO_2$.

Preferably, based on the total weight of the composition for glass, on an oxide basis, the composition for glass contains 45-64 wt % $SiO_2$, 16-25 wt % $Al_2O_3$, 0.1-2 wt % MgO, 10-16 wt % $Na_2O$, 1-15 wt % $P_2O_5$, and optionally 0.01-2 wt % $TiO_2$.

More preferably, based on the total weight of the composition for glass, on an oxide basis, the composition for glass contains 45-64 wt % $SiO_2$, 16-25 wt % $Al_2O_3$, 0.1-2 wt % MgO, 10-16 wt % $Na_2O$, 8-15 wt % $P_2O_5$, and optionally 0.1-1.8 wt % $TiO_2$.

In the composition for glass provided in the present invention, $SiO_2$ is a component that forms the skeleton of the glass. Higher $SiO_2$ content leads to higher chemical resistance and higher mechanical strength, as well as higher high-temperature viscosity of the glass. However, if the content of $SiO_2$ is too high, it will be difficult to obtain glass with slow viscosity change; if the content of $SiO_2$ is too low, it will be difficult to form glass, the strain point will decrease, the expansion coefficient will increase, and the acid resistance and alkali resistance properties will drop. With comprehensive consideration of the melting temperature, upper limit of devitrification temperature, expansion coefficient, mechanical strength, and viscosity change of the glass, etc., based on the total weight of the composition for glass, on an oxide basis, the content of $SiO_2$ in the composition for glass may be 45-64 wt %, such as 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, or 64 wt %.

In the composition for glass provided in the present invention, $Al_2O_3$ can improve the chemical stability of the glass and decrease the tendency towards devitrification of the glass, and can improve the tensile modulus of elasticity, strain point, strength, and chemistry strengthening characteristics of the obtained glass. However, if the content of $Al_2O_3$ is too high, it will be difficult to melt the glass, and the slow viscosity change of the glass will be shortened; in contrast, if the content of $Al_2O_3$ is too low, devitrification may occur easily, and the mechanical strength is lower, and adverse to forming. Therefore, with comprehensive consideration, based on the total weight of the composition for glass, on an oxide basis, the content of $Al_2O_3$ in the composition for glass may be 16-26 wt %, preferably is 16-25 wt %, more preferably is 16-17.5 wt %, further preferably is 16-17 wt %, such as 16 wt %, 17 wt %, 18 wt %, 19 wt %, 20 wt %, 21 wt %, 22 wt %, 23 wt %, 24 wt %, 25 wt %, or 26 wt %.

In the composition for glass provided in the present invention, MgO is beneficial for the melting of the glass, and can improve stability of the glass, inhibit the tendency towards devitrification of the glass, and improve the elastic modulus; however, if the content of MgO is too high, the glass may be devitrified. Therefore, with comprehensive consideration, based on the total weight of the composition for glass, on an oxide basis, the content of MgO in the composition for glass may be 0.1-2 wt %, such as 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, or 2 wt %.

In the composition for glass provided in the present invention, $Na_2O$ is a component for ion exchange. If the content of $Na_2O$ is increased appropriately, the high-temperature viscosity of the glass can be decreased effectively, and improve the meltability and formability of the glass can be improved, and the devitrification of the glass can be improved. However, if the content is too high, the thermal expansion coefficient of the glass may be increased, and the chemical durability of the glass may be degraded. Therefore, with comprehensive consideration, based on the total weight of the composition for glass, on an oxide basis, the content of $Na_2O$ in the composition for glass may be 10-17 wt %, preferably is 10-16 wt %, such as 10 wt %, 11 wt %, 12 wt %, 13 wt %, 14 wt %, 15 wt %, 16 wt %, or 17 wt %.

In the composition for glass provided in the present invention, $P_2O_5$ is a component that can improve ion exchange performance; especially, it can improve the depth of compressive stress layer; however, if the content is too high, phase separation may occur, or the etching rate of the acid (e.g., HCl) may be too high, and the quality of the glass may be degraded. Therefore, with comprehensive consideration, based on the total weight of the composition for glass, on an oxide basis, the content of $P_2O_5$ in the composition for glass may be 0.5-15 wt %, preferably is 1-15 wt %, more preferably is 8-15 wt %, further preferably is 8-9.5 wt %, still further preferably is 8-9 wt %, such as 0.5 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %.

In the composition for glass provided in the present invention, $TiO_2$ is a component that can improve ion exchange performance, decrease high-temperature viscosity, and improve acid resistance; however, if the content is too high, the glass may be stained or easy to be devitrified. Therefore, with comprehensive consideration, based on the total weight of the composition for glass, on an oxide basis, the content of $TiO_2$ in the composition for glass may be 0-2 wt %, preferably is 0.01-2 wt %, more preferably is 0.1-1.8 wt %, further preferably is 0.1-0.9 wt %, such as 0.01 wt %, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, or 1.8 wt %.

According to a preferred embodiment of the present invention, the content of one or more of $K_2O$, $As_2O_3$, $Sb_2O_3$, $SO_3$ and F in the composition for glass is lower than 0.1 wt %. More preferably, the composition for glass does not contain one or more of $K_2O$, $As_2O_3$, $Sb_2O_3$, $SO_3$ and F.

In the present invention, those skilled in the art should understand that the expression "the composition for glass contains $SiO_2$, $Al_2O_3$, MgO, $Na_2O$, $P_2O_5$, and $TiO_2$" means that the composition contains Si-containing compounds, Al-containing compounds, Mg-containing compounds, Na-containing compounds, P-containing compounds, and Ticontaining compounds, and the contents of the aforesaid mentioned components are measured in oxides of the respective elements.

When the composition for glass provided in the present invention is utilized to prepare glass, the obtained glass has excellent overall properties, mainly owing to the cooperation among the components, especially the cooperation among $SiO_2$, $Al_2O_3$, $MgO$, $Na_2O$, $P_2O_5$, and $TiO_2$, particularly the cooperation among the respective components in the aforesaid specific contents.

In a second aspect, the present invention further provides a method for preparing glass, which comprises treating the above-mentioned composition for glass by mixing, melting, homogenization, cast molding, and annealing sequentially.

The specific restrictions on the composition for glass in the method provided in the present invention have been described in the corresponding preceding text, and will not be further detailed here.

In the method provided in the present invention, the melting may be carried out in a Pt—Rh crucible, and preferably, the conditions for the melting include: temperature: 1,550-1,630° C., time: 4-10 h. Those skilled in the art can determine the specific melting temperature and melting time according to the actual circumstance. The specific melting temperature and melting time are well known to those skilled in the art, and will not be further detailed here.

In the method provided in the present invention, the homogenization may be carried out with an existing homogenization method in the art. For example, the bubbles in the molten glass may be expelled out and the components in the molten glass may be distributed uniformly by means of stirring.

In the method provided in the present invention, the cast molding may be carried out with an existing method for cast molding in the art. For example, the cast molding may be carried out in a stainless steel mold; in addition, the specific steps and condition parameters are well known in the art, and will not be further detailed here.

In the method provided in the present invention, preferably, the conditions for annealing treatment include: temperature: 600-700° C.; time: 1-3 h. Those skilled in the art can determine the specific annealing temperature and annealing time according to the actual circumstance. The specific annealing temperature and annealing time are well known to those skilled in the art, and will not be further detailed here.

The method provided in the present invention may further comprise: cooling the annealed glass to room temperature and then machining it.

In the method provided in the present invention, there is no particular restriction on the machining. In other words, the machining may be any common machining in the art. For example, the product obtained through the annealing treatment may be sliced, polished, and chemically reinforced, etc.

In a third aspect, the present invention further provides glass obtained with the above-mentioned preparation method.

According to the present invention, the density of the glass is 2.42 g/cm³ or lower, the strain point is 629° C. or higher, the thermal expansion coefficient at 50-350° C. is $94.19 \times 10^{-7}$/° C. or lower, the Young's modulus is 81.6 GPa or higher, the light transmittance is 90.1% or higher, the compressive stress is 760.5 MPa or higher, the depth of stress layer is 53.1 μm or higher, the fracture toughness is $6.76 MN/m^{3/2}$ or higher, the erosion rate in 5 wt % hydrochloric acid solution is 0.537 mg/cm² or lower, the erosion rate in 10 wt % hydrofluoric acid buffer solution is 1.968 mg/cm² or lower, and the erosion rate in 10 wt % hydrofluoric acid solution is 9.915 mg/cm² or lower.

Preferably, the density of the glass is 2.389-2.42 g/cm³, the strain point is 629-660° C., the thermal expansion coefficient at 50-350° C. is $84.27$-$94.19 \times 10^{-7}$/° C., the Young's modulus is 81.6-83.5 GPa, the light transmittance is 90.1-91.0%, the compressive stress is 760.5-831.5 MPa, the depth of stress layer is 53.1-65.7 μm, the fracture toughness is $6.76$-$7.23 MN/m^{3/2}$, the erosion rate in 5 wt % hydrochloric acid solution is 0.503-0.537 mg/cm², the erosion rate in 10 wt % hydrofluoric acid buffer solution is 1.902-1.968 mg/cm², and the erosion rate in 10 wt % hydrofluoric acid solution is 9.631-9.915 mg/cm².

In a fourth aspect, the present invention further provides an application of the above-mentioned composition for glass or the above-mentioned glass in preparation of display devices, preferably application in preparation of touch screen cover plates.

According to the application described in the present invention, the glass may be chemically strengthened before it is used to produce display devices (especially touch screen cover plates). The chemical strengthening method may be any well-known method in the art. For example, the chemical strengthening method may comprise: strengthening liquid: pure $KNO_3$ molten liquid, temperature: 410-450° C., and time: 3-6 h. The mechanical properties of the glass can be improved by chemical strengthening.

The glass with special performance prepared in the present invention may be used to produce touch screen cover plates through an overflow process.

Hereunder the present invention will be detailed in embodiments. In the following embodiments and comparative examples, unless otherwise specified, all of the materials are commercially available, and all of the methods are common methods in the art.

In the following embodiments and comparative examples, the density of glass is measured with an Archimedean method, in unit of g/cm³.

The strain point of the glass with a three-point tester as per ASTM C-336, in unit of ° C.

The thermal expansion coefficient of the glass at 50-350° C. is measured with a horizontal dilatometer as per ASTM E-228, in unit of $10^{-7}$/° C.

The Young's modulus is measured with a resonance method, in unit of GPa.

The light transmittance of the glass is measured with an UV-visible spectrophotometer, in unit of %.

The surface compressive stress (in unit of MPa) and the depth of compressive stress layer (in unit of μm) are measured with a FSM-6000LE surface stressometer.

The fracture toughness of the glass is measured as per GB4161-2007, in unit of $MN/m^{3/2}$.

The erosion rate of the glass in 5 wt % hydrochloric acid solution is detected with a weight loss method, under the following conditions of detection: fault-free glass is immersed in 5 wt % hydrochloric acid solution at 95° C. and eroded for 24 h while shaking, the erosion rate is calculated with a calculation formula Erosion Rate=(M'−M)/S, wherein M' represents the weight of the sample before the erosion, M represents the weight of the sample after the erosion, S represents the surface area of the sample, and the unit is mg/cm².

The erosion rate of the glass in 10 wt % hydrofluoric acid buffer solution is detected with a weight loss method, under the following conditions of detection: fault-free glass is immersed in 10 wt % hydrofluoric acid buffer solution (volume ratio of $NH_4$:HF=6:1) at 20° C. and eroded for 20 min. while shaking, the erosion rate is calculated with a calculation formula Erosion Rate=(M'−M)/S, wherein M' represents the weight of the sample before the erosion, M represents the weight of the sample after the erosion, S represents the surface area of the sample, and the unit is mg/cm$^2$.

The erosion rate of the glass in 10 wt % hydrofluoric acid solution is detected with a weight loss method, under the following conditions of detection: fault-free glass is immersed in 10 wt % hydrofluoric acid solution at 20° C. and eroded for 20 min. while shaking, the erosion rate is calculated with a calculation formula Erosion Rate=(M'−M)/S, wherein M' represents the weight of the sample before the erosion, M represents the weight of the sample after the erosion, S represents the surface area of the sample, and the unit is mg/cm$^2$.

Embodiments 1-12 and Comparative Samples 1-3

The components are weighed as indicated in Tables 1 and 2 and mixed to a homogeneous state, the mixture is poured into a Pt—Rh crucible, then the crucible is heated in a resistance oven at 1,550° C. for 7 h, while the mixture is stirred with a platinum rod to expel the bubbles. The molten glass is poured into a stainless steel/cast iron mold and formed into glass product in a specified shape, then the glass product is annealed in an annealing furnace at 650° C. for 3 h, and then the power is turned off and the glass product is cooled in the furnace to 25° C. The glass product is sliced, burnished and polished, the surface of the obtained glass product after polishing is produced into a finished glass product (in thickness of 0.7 mm), the finished glass product is washed with deionized water, and then immersed in molten $KNO_3$ at 430° C. and treated for 3 h, and then is taken out and cooled to 25° C., washed with deionized water and then dried, so that a finished glass product is obtained finally. The properties of the glass product are tested respectively. The results are shown in Tables 1-3.

TABLE 1

|  | Example 1 | Example 2 | Example 3 | Example 4 | Example 5 |
|---|---|---|---|---|---|
| $SiO_2$ (g) | 45 | 46 | 47 | 48 | 49 |
| $Al_2O_3$ (g) | 25 | 23.2 | 21.5 | 24 | 23.5 |
| MgO (g) | 2 | 1.5 | 2 | 1.5 | 1.8 |
| $Na_2O$ (g) | 16 | 14 | 13 | 14.5 | 15.7 |
| $P_2O_5$ (g) | 11 | 13.5 | 15 | 12 | 10 |
| $TiO_2$ (g) | 1 | 1.8 | 1.5 | 0 | 0 |
| Density (g/cm$^3$) | 2.393 | 2.391 | 2.389 | 2.401 | 2.406 |
| Strain point (° ) | 631 | 629 | 632 | 646 | 651 |
| Expansion coefficient ($\times 10^{-7}$/°7) | 87.61 | 85.29 | 89.60 | 91.82 | 90.24 |
| Young's modulus (GPa) | 82.5 | 81.6 | 82.9 | 83.5 | 82.7 |
| Light transmittance (%) | 90.1 | 90.3 | 90.7 | 90.4 | 91.0 |
| Compressive stress (MPa) | 787.4 | 792.3 | 760.5 | 780.1 | 797 |
| Depth of stress layer (μm) | 61.2 | 60.9 | 65.7 | 64.6 | 59.5 |
| Fracture toughness (MN/m$^{3/2}$) | 6.86 | 7.23 | 6.98 | 7.11 | 6.90 |
| HCl-5%, 24 h, 95°5 (mg/cm$^2$) | 0.508 | 0.523 | 0.517 | 0.504 | 0.535 |
| $NH_4$:HF-10%, 20 min, 20° C. (mg/cm$^2$) | 1.968 | 1.938 | 1.928 | 1.939 | 1.908 |
| HF-10%, 20 min, 20° C. (mg/cm$^2$) | 9.907 | 9.806 | 9.682 | 9.674 | 9.915 |

TABLE 2

|  | Example 6 | Example 7 | Example 8 | Example 9 | Example 10 |
|---|---|---|---|---|---|
| $SiO_2$ (g) | 60 | 61 | 62 | 63 | 64 |
| $Al_2O_3$ (g) | 18 | 17 | 16 | 16.5 | 17.5 |
| MgO (g) | 1 | 0.5 | 1.9 | 0.1 | 0.5 |
| $Na_2O$ (g) | 12 | 13 | 11 | 10 | 10 |
| $P_2O_5$ (g) | 9 | 8 | 9 | 9.5 | 8 |
| $TiO_2$ (g) | 0 | 0.5 | 0.1 | 0.9 | 0 |
| Density (g/cm$^3$) | 2.411 | 2.409 | 2.410 | 2.405 | 2.416 |
| Strain point (° C.) | 649 | 653 | 655 | 660 | 658 |
| Expansion coefficient ($\times 10^{-7}$/° C.) | 88.79 | 86.08 | 85.99 | 86.16 | 84.27 |
| Young's modulus (GPa) | 81.7 | 82.6 | 83.1 | 82.9 | 83.3 |
| Light transmittance (%) | 90.3 | 90.6 | 90.1 | 90.6 | 90.8 |
| Compressive stress (MPa) | 802.7 | 811 | 809.3 | 810.1 | 809.5 |
| Depth of stress layer (μm) | 58.9 | 58.2 | 59.1 | 57.4 | 59.7 |
| Fracture toughness (MN/m$^{3/2}$) | 6.95 | 7.08 | 7.02 | 6.94 | 6.83 |
| HCl-5%, 24 h, 95° C. (mg/cm$^2$) | 0.515 | 0.530 | 0.528 | 0.510 | 0.537 |
| $NH_4$:HF-10%, 20 min, 20° C. (mg/cm$^2$) | 1.958 | 1.902 | 1.939 | 1.907 | 1.916 |

TABLE 2-continued

|  | Example 6 | Example 7 | Example 8 | Example 9 | Example 10 |
|---|---|---|---|---|---|
| HF-10%, 20 min, 20° C. (mg/cm$^2$) | 9.782 | 9.805 | 9.795 | 9.812 | 9.853 |

TABLE 3

|  | Example 11 | Example 12 | Comparative example 1 | Comparative example 2 |
|---|---|---|---|---|
| SiO$_2$ (g) | 62.5 | 63.2 | 68 | 63.6 |
| Al$_2$O$_3$ (g) | 17.5 | 15.5 | 14 | 18 |
| MgO (g) | 1 | 0.8 | 5 | 2.8 |
| Na$_2$O (g) | 11.3 | 13 | 9 | 15 |
| P$_2$O$_5$ (g) | 5.5 | 5 | 0.1 | 0 |
| TiO$_2$ (g) | 0.2 | 0.5 | 3.9 | 0.6 |
| K$_2$O (g) | 0 | 0 | 0 | 0 |
| As$_2$O$_3$ (g) | 0 | 0 | 0 | 0 |
| Sb$_2$O$_3$ (g) | 2 | 0 | 0 | 0 |
| SO$_3$ (g) | 0 | 2 | 0 | 0 |
| F (g) | 0 | 0 | 0 | 0 |
| Density (g/cm$^3$) | 2.407 | 2.411 | 2.443 | 2.428 |
| Strain point (° C.) | 639 | 641 | 625 | 619 |
| Expansion coefficient (×10$^{-7}$/° C.) | 93.76 | 89.41 | 69.21 | 94.56 |
| Young's modulus (GPa) | 82.9 | 83.1 | 80.9 | 81.3 |
| Light transmittance (%) | 90.4 | 90.3 | 90.0 | 90.1 |
| Compressive stress (MPa) | 831.5 | 830.7 | 953.3 | 855.0 |
| Depth of stress layer (μm) | 53.1 | 53.9 | 40.7 | 50.5 |
| Fracture toughness (MN/m$^{3/2}$) | 6.82 | 6.76 | 5.83 | 6.49 |
| HCl-5%, 24 h, 95° C. (mg/cm$^2$) | 0.503 | 0.516 | 0.558 | 0.549 |
| NH$_4$:HF-10%, 20 min, 20° C. (mg/cm$^2$) | 1.912 | 1.904 | 1.952 | 1.947 |
| HF-10%, 20 min, 20° C. (mg/cm$^2$) | 9.731 | 9.671 | 9.942 | 9.953 |

It is seen from the results in the above Tables 1-3: the glass prepared in the present invention has a high chemical resistance, a higher strain point, a higher compressive stress on glass surface and depth of compressive stress layer in the glass, and higher Young's modulus, and thereby achieves excellent fracture toughness, which is greatly beneficial for decreasing the brittleness of the glass and improving the impact resistance of the glass; in addition, the glass for cover plates is resistant to devitrification and easy to be vitrified, meets the production process requirements, has excellent heat resistance, impact resistance, scratch resistance and abrasion resistance properties, can effectively protect the glass surfaces of display products against damages from impact and scratching, and meets the requirements for glass for cover plates (especially glass for touch screen cover plates).

In addition, it is seen from the results of comparison between the embodiments 1-12 and the comparative examples 1-2: by confining the contents of the components within specific ranges in the present invention, the chemical stability, fracture toughness and impact resistance of the obtained glass are improved, and the glass has excellent chemical resistance. Furthermore, it is seen from the result of comparison between the embodiments 1-10 and the embodiments 11-12: by further confining the contents of the components within preferred ranges in the present invention, the chemical stability, fracture toughness and impact resistance of the obtained glass are further improved, and thereby a glass product with optimal overall properties is obtained.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be noted that the specific technical features described in above embodiments may be combined in any appropriate form, provided that there is no conflict. To avoid unnecessary repetition, the possible combinations are not described specifically in the present invention.

Moreover, different embodiments of the present invention may also be combined freely as required, as long as the combinations don't deviate from the ideal and spirit of the present invention. However, such combinations shall also be deemed as falling into the scope disclosed in the present invention.

The invention claimed is:

1. A composition for glass, based on the total weight of the composition for glass, on an oxide basis, consisting of 45-47 wt % SiO$_2$, 21.5-25 wt % Al$_2$O$_3$, 1.5-2 wt % MgO, 13-16 wt % Na$_2$O, 11-15 wt % P$_2$O$_5$, and 1.1-1.8 wt % TiO$_2$.

2. The composition for glass of claim 1, wherein the composition does not contain one or more of K$_2$O, As$_2$O$_3$, Sb$_2$O$_3$, SO$_3$, and F.

3. A method for preparing glass, comprising treating the composition for glass of claim 1 by mixing, melting, homogenization, cast molding, and annealing sequentially.

4. The method of claim 3, further comprising: treating the annealed glass by slicing, polishing, and chemical strengthening.

5. Glass obtained with the preparation method of claim 3.

6. The glass of claim 5, wherein the density of the glass is 2.42 g/cm$^3$ or lower, the strain point is 629° C. or higher, the thermal expansion coefficient at 50-350° C. is 94.19×10$^{-7}$/° C. or lower, the Young's modulus is 81.6 GPa or higher, the light transmittance is 90.1% or higher, the compressive stress is 760.5 MPa or higher, the depth of stress layer is 53.1 μm or higher, the fracture toughness is 6.76MN/m$^{3/2}$ or higher, the erosion rate in 5 wt % hydrochloric acid solution is 0.537 mg/cm$^2$ or lower, the erosion rate in 10 wt % hydrofluoric acid buffer solution is 1.968 mg/cm$^2$ or lower, and the erosion rate in 10 wt % hydrofluoric acid solution is 9.915 mg/cm$^2$ or lower.

7. The glass of claim 5, wherein the density of the glass is 2.389-2.42 g/cm$^3$, the strain point is 629-660° C., the thermal expansion coefficient at 50-350° C. is 84.27-94.19×10$^{-7}$/° C., the Young's modulus is 81.6-83.5 GPa, the light transmittance is 90.1-91.0%, the compressive stress is 760.5-831.5 MPa, the depth of stress layer is 53.1-65.7 μm, the fracture toughness is 6.76-7.23MN/m$^{3/2}$, the erosion rate in 5 wt % hydrochloric acid solution is 0.503-0.537 mg/cm$^2$, the erosion rate in 10 wt % hydrofluoric acid buffer solution is 1.902-1.968 mg/cm$^2$, and the erosion rate in 10 wt % hydrofluoric acid solution is 9.631-9.915 mg/cm$^2$.

8. A method for preparing display devices, comprising providing the composition for glass of claim 1.

9. The method of claim 8, wherein the display devices are touch screen cover plates.

* * * * *